United States Patent
Jussy et al.

(10) Patent No.: US 7,058,972 B2
(45) Date of Patent: Jun. 6, 2006

(54) SYSTEM AND METHOD FOR CONTROLLING NETWORK ELEMENTS USING SOFTKEYS

(75) Inventors: Isabelle Jussy, Montreal (CA); Michel Fortier, Ile des Soeurs (CA); Bernard Desmarais, Montreal (CA)

(73) Assignee: Marconi Intellectual Property (Ringfence) Inc., Warrendale, PA (US)

( * ) Notice: Subject to any disclaimer, the term of this patent is extended or adjusted under 35 U.S.C. 154(b) by 729 days.

(21) Appl. No.: 09/875,723

(22) Filed: Jun. 6, 2001

(65) Prior Publication Data

US 2002/0032872 A1   Mar. 14, 2002

Related U.S. Application Data

(60) Provisional application No. 60/209,821, filed on Jun. 6, 2000, provisional application No. 60/223,078, filed on Aug. 4, 2000.

(51) Int. Cl.
*G06F 11/30* (2006.01)
(52) U.S. Cl. .......................... 726/7; 380/277; 380/278; 709/221; 709/226; 709/229; 713/1; 713/192; 713/193
(58) Field of Classification Search .............. 713/201; 709/220–229
See application file for complete search history.

(56) References Cited

U.S. PATENT DOCUMENTS

| | | | |
|---|---|---|---|
| 5,475,746 A | | 12/1995 | Miller et al. |
| 5,896,499 A | * | 4/1999 | McKelvey .................... 726/11 |
| 5,943,423 A | * | 8/1999 | Muftic ........................ 705/67 |

(Continued)

FOREIGN PATENT DOCUMENTS

EP   0845892 A2   6/1998

OTHER PUBLICATIONS

Opto 22, "SNAP Ethernet-Based I/O Units User's Guide", Nov. 2005, Opto 22, entire document, opto22.com/asset/documents/1460_SNAP_Eth-Based_IO_Units_Users_Guide.pdf.*

(Continued)

*Primary Examiner*—Ayaz Sheikh
*Assistant Examiner*—Ronald Baum
(74) *Attorney, Agent, or Firm*—Jones Day

(57) ABSTRACT

A system for enabling the use of network features in a network element is provided. The system comprises a softkey assignment system that is operable to perform operations with respect to at least one softkey, the softkey assignment system being operable to assign a softkey value to the softkey and to update the softkey status to an assigned state upon the assignment of a softkey value to the softkey, the softkey assignment system also being operable to update the softkey status to an unassigned state upon the receipt of a deactivated softkey value for the softkey. The system also comprises a network element. The network element comprises a service module and a softkey validation system. The service module provides a first network features that may be optionally enabled or disabled. The softkey validation is operable to enable the use of the first network feature when a received softkey value is the same as a first valid softkey value. The softkey validation system is also operable to enable the use of the first network feature a second time, after the first network feature has been deactivated, when the received softkey value is the same as a second valid softkey value, wherein the first valid softkey value is not the same as the second valid softkey value.

34 Claims, 6 Drawing Sheets

U.S. PATENT DOCUMENTS 5,978,912 A * 11/1999 Rakavy et al. .................. 713/2
6,587,874 B1 * 7/2003 Golla et al. .................. 709/220
6,609,207 B1 * 8/2003 Cromer et al. ............... 713/162
6,625,689 B1 * 9/2003 Narad et al. ................. 711/110
6,684,330 B1 * 1/2004 Wack et al. ................. 713/202

OTHER PUBLICATIONS

Nagano, Yukari and Uchida, Naoki, Verification of Customer-Defined Services in the Intelligent Network, NTT Intelligent Network System Laboratory, May 4, 1992, pp. 151-161, XP 000684012.

* cited by examiner

SYSTEM AND METHOD FOR CONTROLLING NETWORK ELEMENTS USING SOFTKEYS

This application claims the benefit under 35 U.S.C. § 119(e) to copending U.S. Provisional Patent Application No. 60/209,821 entitled "System and Method for Controlling Network Elements Using SmartKeys" and filed on Jun. 6, 2000. This application also claims the benefit under 35 U.S.C. § 119(e) to copending U.S. Provisional Patent Application No. 60/223,078 entitled "System and Method for Controlling Network Elements Using SmartKeys" and filed on Aug. 4, 2000. This application also incorporates copending U.S. Provisional Patent Application Nos. 60/209821 and 60/223,078 by reference as if fully rewritten here.

BACKGROUND OF THE INVENTION

1. Technical Field

The present invention is generally directed to the field of data communication networks that have a plurality of network elements. More specifically, the invention is directed to a system and method for enabling and/or disabling on demand the features, functions and configuration of network elements using software keys.

2. Description of the Related Art

Configuration control keys of various types are known in this field. The two most prevalent types of control keys are hardware keys and software keys. Hardware keys typically include metal, magnetic strip readable or other forms of electronic keys that can be used on a system to prevent the operation of the system without the key. For example, a hardware key may be configured to plug into an I/O port of a computer system, and certain features of the computer system, or certain software applications, may be prevented from operating unless the hardware key is coupled to the I/O port. Hardware keys are limited in their usefulness, however, as they require a dedicated piece of hardware to operate, and typically cannot be remotely enabled/disabled or configured.

Software keys are generally used to enable a particular piece of software to run. For example, a special password, serial number, configuration value, or some other form of soft information may be used to enable or disable the software program. These types of software keys, however, have limited utility in the context of a distributed network having numerous network elements since these keys cannot be removed or securely deployed elsewhere in the network.

Therefore, there remains a need in this art for an improved software key system for enabling or disabling the use of network elements in a distributed network.

SUMMARY OF THE INVENTION

The present invention improves upon the current state of the art by providing a novel system and method for enabling and/or disabling network element features in a network. The present invention provides a system through which the use of specific features in a network, whether hardware or software, can be enabled or disabled. The present invention utilizes a concept referred to as softkeys (software keys). The softkeys in a preferred embodiment are managed by the system in a manner that enables the softkeys to be reused and deployed throughout the network as needed.

In accordance with the present invention, a system for enabling the use of network features in a network element is provided. The system comprises a softkey assignment system that is operable to perform operations with respect to at least one softkey, the softkey assignment system being operable to assign a softkey value to the softkey and to update the softkey status to an assigned state upon the assignment of a softkey value to the softkey, the softkey assignment system also being operable to update the softkey status to an unassigned state upon the receipt of a deactivate softkey value for the softkey. The system also comprises a network element. The network element comprises a service module and a softkey validation system. The service module provides a first network feature that may be optionally enabled or disabled. The softkey validation system is operable to enable the use of the first network feature when a receive softkey value is the same as a first valid softkey value. The softkey validation system is also operable to enable the use of the first network feature a second time, after the first network feature has been deactivated, when the received softkey value is the same as a second valid softkey value, wherein the first valid softkey value is not the same as the second valid softkey value.

BRIEF DESCRIPTION OF DRAWINGS

The present invention will become more apparent from the following description when read in conjunction with the accompanying drawings wherein.

DETAILED DESCRIPTION

The present invention provides a system for enabling and/or disabling network element features in a communication network using a concept referred to herein as softkey. A softkey is a form of software key that can be used to enable/disable features in a network element. The use of the softkey provides a way in which the use of a specific feature in a network, whether hardware or software, can be totally enabled or disabled in one embodiment, or in a preferred embodiment enabled or disabled yet provide the potential usage of the feature with one or more alarms being generated that cannot be eliminated from the network management system until a proper valid softkey is provided. Hereinafter, whenever the terms enable or disable are used, it is to be understood that enable is meant to cover both the case of totally authorizing a feature for use and the case of authorizing the use of a feature so that an alarm will not be generated because the use of the feature was unauthorized. In a preferred embodiment, the softkey are managed by the system in a manner that allows them to be reused and deployed throughout the network as needed. The invention is particularly useful for controlling the features of network elements in a SONET/SDH network, such as a digital cross connect, or Add-Drop Multiplexer (ADM), where a user's needs for various levels of service may change over time, although, alternatively, the concepts presented in this disclosure could be used with other types of network elements, with a variety of network types, such as IP, ATM, Frame Relay, FDDI, wavelength enabling or tunable laser systems, etc., and with a variety of network topologies such as point-to-point, ring, mesh, variant forms of the foregoing, and others.

Figure 1:
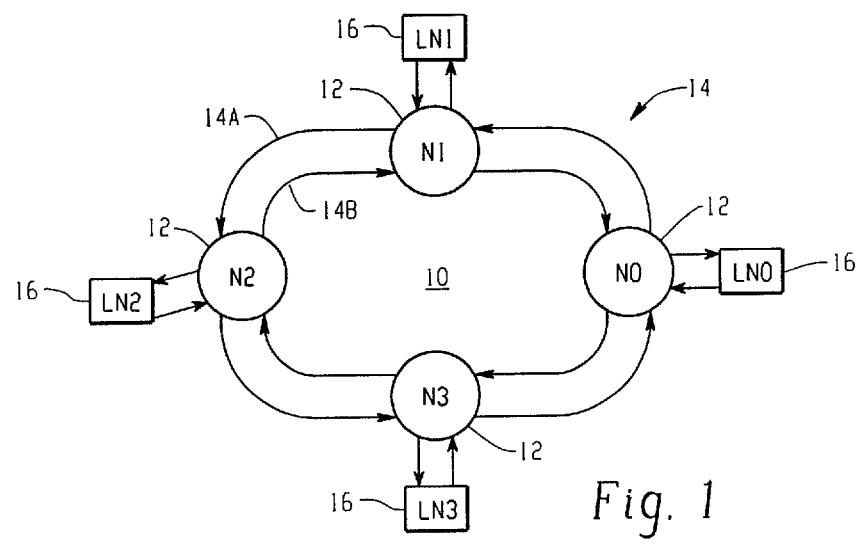
FIG. 1 is a diagram of an exemplary communication network for which the present invention is particularly useful.

Referring now to the drawings, shown in FIG. 1 is an exemplary communication system 2 for which the present invention is particularly useful. The exemplary communication system 2 comprises a fiber optic system that is arranged in a ring network 10 and more preferably in a Synchronous Optical Network ("SONET") or SDH ring. The SONET/SDH ring 10 includes a plurality of network nodes 12, labeled N0–N3, coupled in the ring structure by one or more communication paths 14A, 14B. As shown in FIG. 1, the two paths 14A, 14B transport SONET/SDH data streams (many packets/cells) in opposite directions about the ring (i.e., east and west). The communication paths 14A, 14B are preferably fiber optic connections (in SONET/SDH), but could, alternatively be electrical paths or even wireless connections (in other types of ring networks). In the case of a fiber optic connection, paths 14A, 14B could be implemented on a single fiber 14, on dual fibers 14A, 14B, or some other combination of connections. Each network node 12 is preferably coupled to two other network nodes 12 in the ring structure 10. For example, network node N0 is coupled to network nodes N1 and N3. The coupling between the nodes in FIG. 1 is two-way, meaning that each node 12 transmits and receives data (packets/cells) to and from each of the two other nodes 12 to which it is connected. Each network node 12 includes at least two transmitter/receiver interfaces, one for each connection to another node 12. The network nodes 12 could be many types of well-known network devices, such as add-drop multiplexers ("ADMs"), switches, routers, cross-connects or other types of devices. These network devices are examples of network elements ("NEs"). The devices 12 shown in FIG. 1 are preferably ADMs. An ADM is a three terminal device having a local add/drop interface, an upstream network node interface, and a downstream network node interface. These ADMs 12 are coupled to local nodes 16, and are used to add traffic from the local nodes 16 to the SONET/SDH data stream, and conversely to drop traffic (frames, packets, cells, wavelengths, etc.) from the SONET/SDH data stream to the local nodes 16. A system and method for packet transport in a SONET/SDH ring network and an exemplary ADM is described in more detail in commonly-assigned U.S. patent application Ser. No. 09/378,844 ("the '844 application"), which is incorporated herein by reference. For more information on SONET/SDH formats, line-speeds, and theory of operation, see John Bellamy, *Digital Telephony*, 2d Edition (1991), pp. 403–425.

The network nodes 12 shown in FIG. 1 may be logically connected by a plurality of virtual paths that coexist on the physical network connection(s) 14. Virtual paths are also known as logical paths or "pipes." For example, although there is only one physical connection from node N0 to node N1 to node N2, there may be numerous virtual paths between these nodes, such as one virtual path from N0 to N1, another from N0 to N2 and another from N1 to N2. Each virtual path may include a plurality of virtual channels, wherein each virtual channel transports frames, packets, or cells formatted according to the SONET/SDH SPE. The use of virtual paths in SONET/SDH ring networks is described in more detail in commonly-assigned U.S. patent application Ser. No. 09/324,244 ("the '244 application"), which also is incorporated herein by reference.

Figure 2:
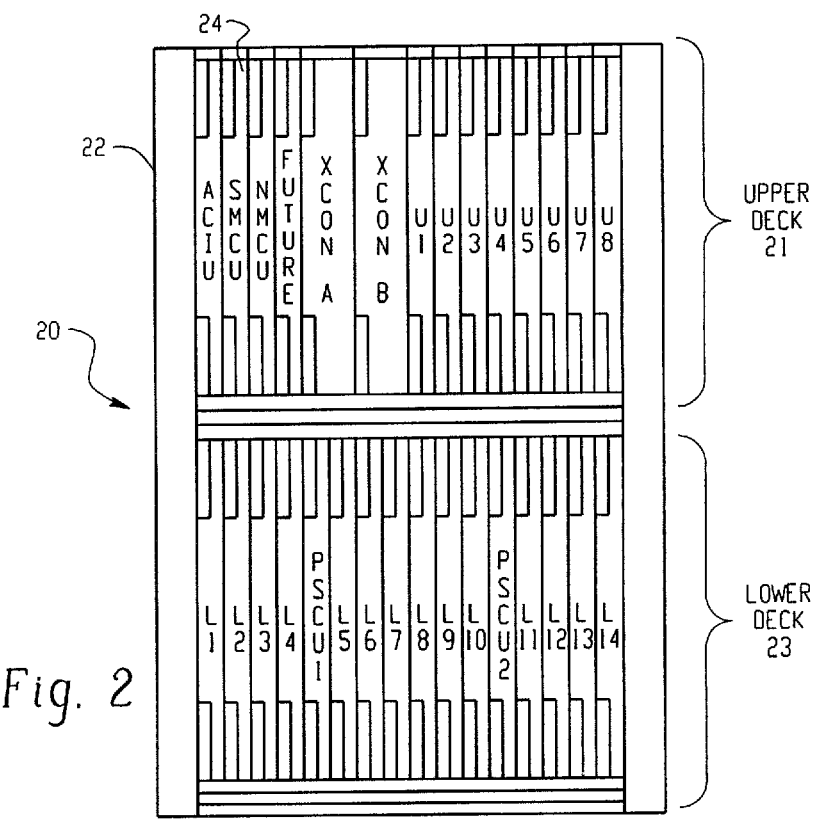
FIG. 2 is a block diagram of an exemplary Network Element for which the present invention is particularly useful.

An exemplary network node element for which the softkeys concept is particularly useful is the Marconi MCN 7000. The MCN 7000 is an advanced network element available from Marconi Communications. As illustrated in FIG. 2, the MCN 7000 20 is a platform comprising many CPU-based elements. Each element is identifiable by a unique serial number. Each element is also housed inside the upper deck 21 or the lower deck 23 in the MCN 7000 enclosure 22.

Figure 3:
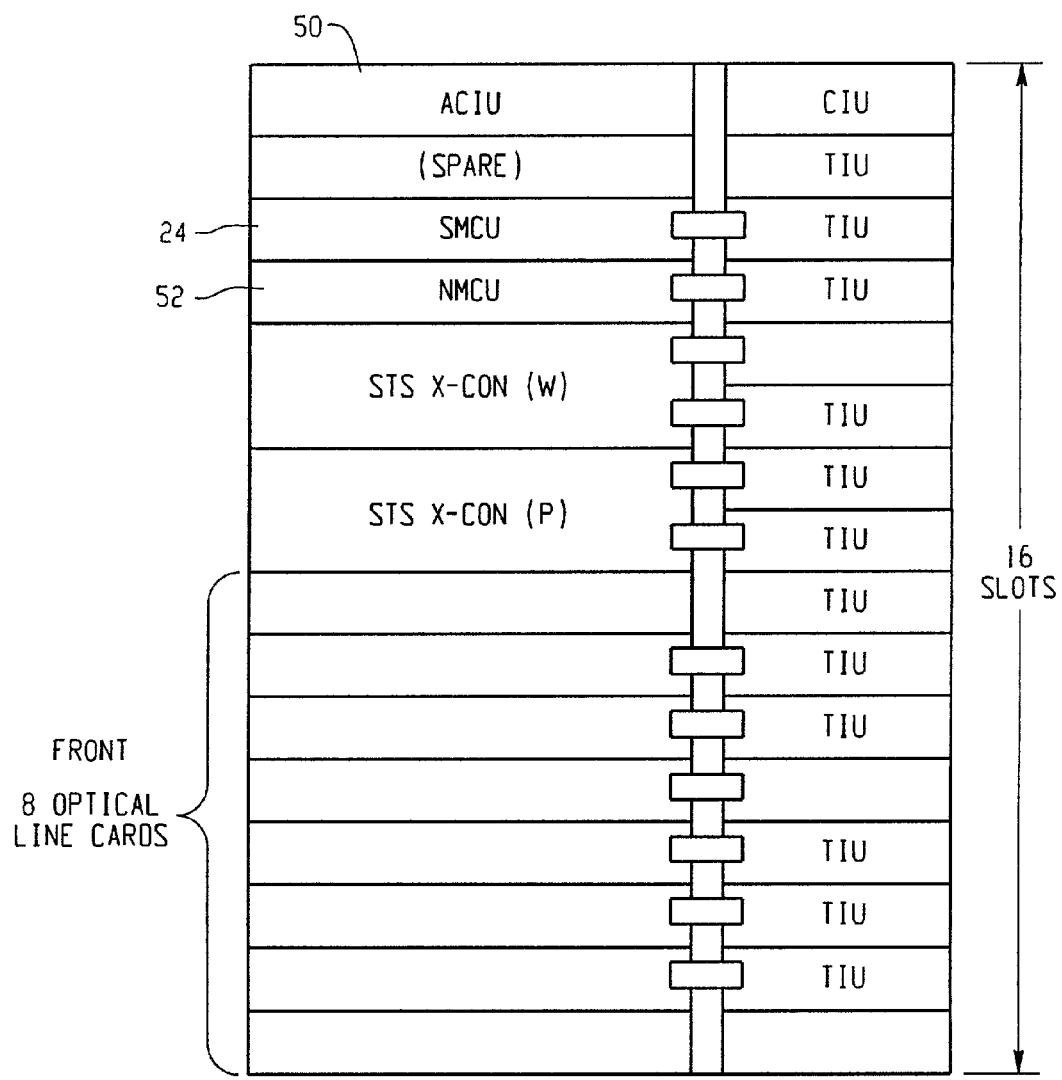
FIG. 3 is a block diagram showing a top view of the upper deck of the exemplary Network Element.
Figure 4:
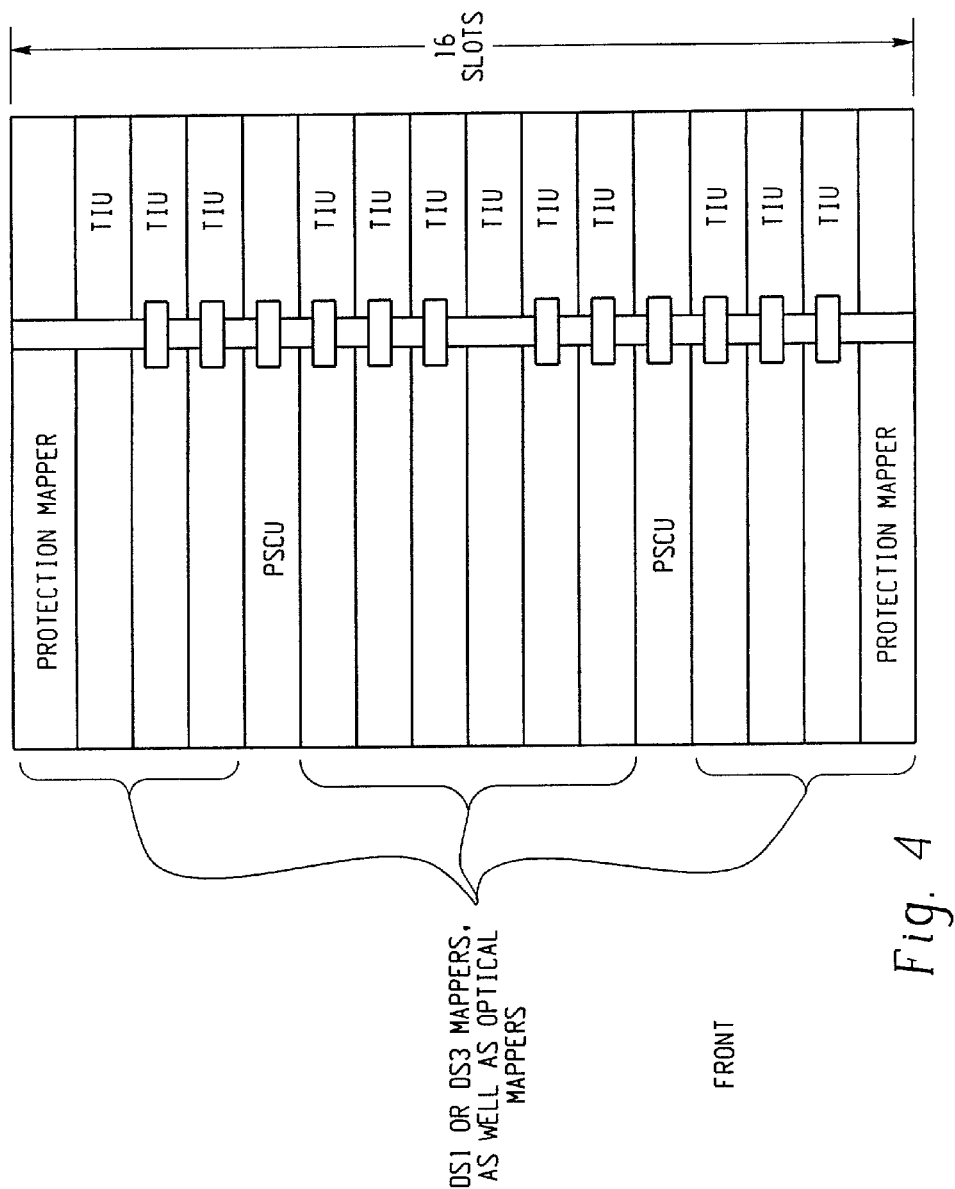
FIG. 4 is a block diagram showing a top view of the lower deck of the exemplary Network Element.

In the exemplary MCN 7000 20, a total of 30 modules can be installed. As shown in FIG. 3, the top deck 21 comprises fourteen slots, six reserved for the common modules (System and Network processors, Cross-Connect matrix, etc. . . ) and eight slots for optical modules (OC-3/12/48/192). As shown in FIG. 4, the bottom deck 33 comprises sixteen slots that can be used either for electrical (DS1, E1, DS3, EC-1) or for optical modules (OC-3/12/48). Of these sixteen traffic-carrying slots, two can be used to protect electrical signal mappers in any mix (DS1, E1, DS3, EC-1), with a 1:6 protection ratio. Twelve slots have electrical interfacing capabilities in two groups of six and the two remaining slots are used to relay traffic to the appropriate protection mappers. More details on the MCN 7000 are described later in this disclosure.

An embodiment of the present invention as implemented within the MCN 7000 will now be described. The description that follows will be presented with reference to a hardware provider, a service provider and an end user. The hardware provider is the entity that owns the network element and that sells all or portions of the functionality of the network element to a service provider. The service provider is an entity that purchases all or substantial portions of the functionality of the network element from the hardware provider and that in turn resells smaller portions of the functionality to end users. The end users are the entities that actually use the functionality and services provided by the network element.

The exemplary embodiment will also be presented with reference to an optical mapper within the MCN 7000 for use with SONET/SDH digital data streams. The optical mapper comprises a dual rate, four-port OC-3/OC-12 module. The module has up to four ports that can be operated, independently of each other, either as OC-3 or OC-12.

Within a network element such as the MCN 7000, there is generally an element that is defined as a "system processor" or "shelf processor" ("SP"). The SP controls the verification of the elements within the shelf, their compatibility with the software release that is being used with the network element, the loading of required software elements, and the control of alarm displays. The SP in the exemplary system of FIG. 2 is the SMCU element 24.

Figure 5:
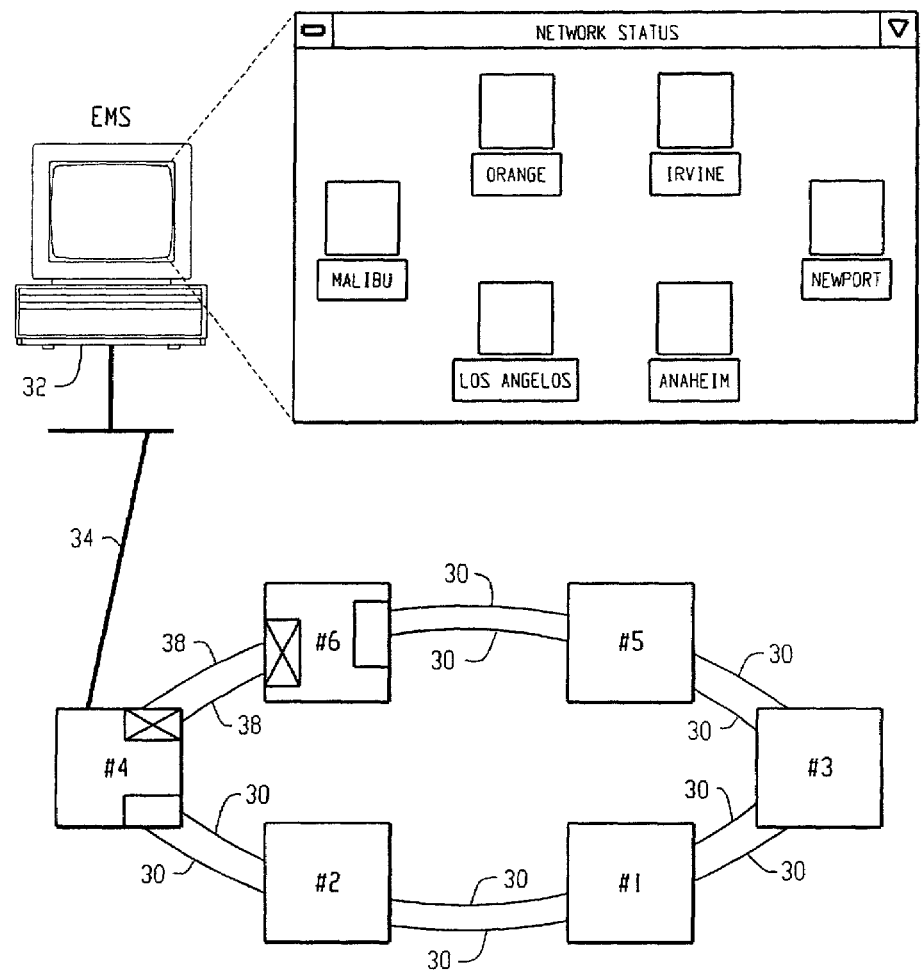
FIG. 5 is a diagram of an exemplary communication network that utilizes the softkey concept.

Now with reference to FIG. 5, a service provider may initially desire to purchase network equipment and software that has one level of functionality but with the capability of being upgraded in the future to different capabilities as the demand for the service provider's network services change. In accordance with this desire, the present invention provides a mechanism and method whereby a hardware provider can provide to a service provider network elements having high levels of functionality but with the use of that functionality controllable via the softkey concept of the present invention.

For example, a service provider may purchase six network elements to establish the communication network shown in FIG. 5. The interconnection shown is preferably based on optical links, such as OC-3 (155 Mb/s) SONET links. For purposes of this example, it is assumed that a communication path 30 exists based on optical signals between the chain of nodes #4, #2, #1, #3, #5, and #6. Also, in this example, network element #4 and network element #6 are each equipped with optical mappers, each optical mapper being capable of servicing four communication channels at an OC-3 or OC-12 data rate. The service provider, however, may have initially purchased the right to use less than all of the available channels of these optical mappers and purchased the right to operate the channels at OC-3 data rate. The softkeys concept of the present invention provides the hardware provider a mechanism and method for upgrading the service provider's purchased equipment to include all of the available channels and the right to operate the channels at OC-12 without having to physically go to the equipment room where the network elements are located to either install hardware or software or to manually enter hardware or software keys. This is advantageous because, among other things, the network elements may be housed remotely and they may not be readily accessible. Thus, the softkeys concept of the present invention allows the hardware provider to remotely control the features and functions of the network element as the service provider's needs change. This can add up to great operational savings in dispatching personnel as well as providing efficient and quick service deployment.

In this exemplary embodiment, network elements #4 and #6 could have been initially sold by the hardware provider to the software provider having a configuration that is limited to one mapper working with two channels at OC-3 rates. In this initial configuration, the service provider would purchase two softkeys to obtain the authorization to use two channels at OC-3 rates on the mapper. Later, when the service provider wishes to add more channels or to change the bit-rate, the service provider can purchase additional softkeys to enable the use of the desired features.

Configuration operations, such as putting circuit module into service and installing softkeys can be accomplished in this type of network via an Element Management System 32 (EMS). The EMS 32 is a device used by the service provider to manage the network. It preferably is a PC with software for communicating with the NE via a LAN 34. In the exemplary embodiment, the EMS also communicates with the other network elements (NEs) through the existing network communication path 30. Alternatively, however, a LAN network could be used to interconnect each NE to the EMS workstation 32.

Assuming that the service provider has had fiber optic cabling 38 installed to provide a physical connection between NE#4 and NE#6, the service provider can install the softkeys purchased from the hardware supplier and use the EMS to activate the link between NE#4 and NE#6. The EMS 32, as shown in FIG. 5, also preferably includes the capability to graphically represent the state of the network.

Figure 6:
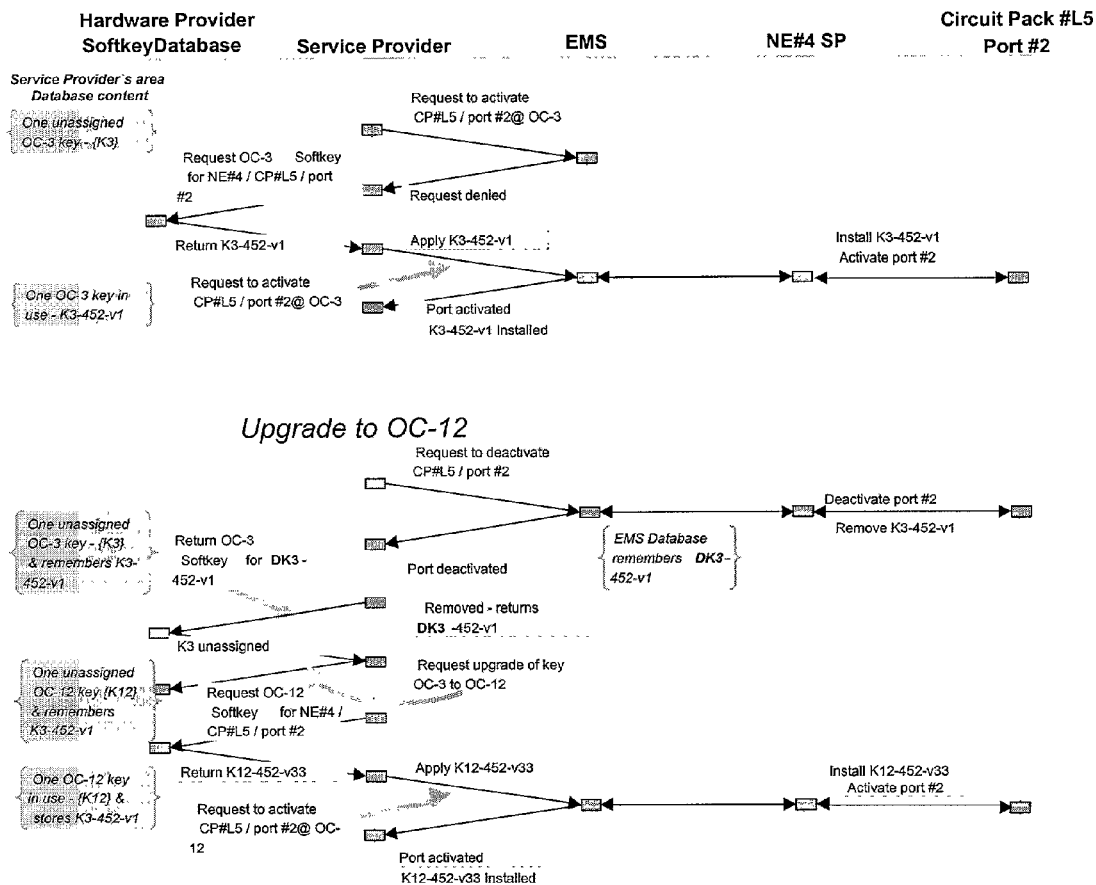
FIG. 6 is a state diagram depicting an exemplary sequence of steps to practice the present invention.

FIG. 6 is a state diagram illustrating the preferred method for installing, removing and upgrading softkeys for enabling the link between Nodes #4 and #6. The figure depicts the process through a series of steps (Steps 1 through Steps 27) in the state diagram table. Included in the process are interactions between the service provider, the hardware supplier softkey database, the EMS and its associated database, the SP in the NE and its associated database, and the port of the circuit module being activated.

Each of the steps shown in FIG. 6 will now be discussed in more detail. To enable one channel at the OC-3 data rate the following steps are preferably used. In step 1, the service provider issues a command to the EMS attempting to provision port #2, on circuit pack #5 on NE#4. Circuit pack #5 in this example is the circuit module having functions that will be activated.

In step 2, because the service provider does not provide a softkey with the command for provisioning that circuit pack/port number, the EMS responds to the service provider with a request denied indication.

In step 3, the service provider requests an unassigned softkey from the hardware supplier database. In the service provider's area database content, an unassigned OC-3 key is available because the service provider has already purchased it.

In step 4, the hardware supplier database will search its content to verify that no previous keys had been assigned for that circuit pack/port number. Because no previous keys for that circuit pack/port number had been issued, the hardware supplier database system will take the unassigned key, assign it to circuit pack #5, port #2, generate a key value for the key, encrypt the key value, and return an encrypted key value (e.g., K3-452-V1). If the supplier database had found that a previous key had been issued for that service pack, it would have returned a message indicating that a softkey had already been assigned to that circuit pack/port. The extension "V1" in this exemplary key indicates that the key value was generated using a secure process that results in a key value that is valid once and not reusable for the same circuit pack/port at a different time. The secure process is employed to prevent the illegal use of keys once deactivated and returned to the hardware database. For example, without the secure key generation process, a service provider could purchase a softkey to enable a port, disable the port and return the softkey in exchange for a new softkey value to enable a different port on a different or same circuit pack, and then re-use the first softkey to enable the first port. In that example, two softkeys could have been deployed in a case where the service provider has only purchased one softkey.

In step 5, the service provider provides the softkey value K3-452-V1 to the EMS software with a command to the EMS to provision port #2, on circuit pack #5. The command is valid at this time because the EMS is supplied with a softkey.

In step 6, the EMS accepts the command and issues a complementary command with the softkey value to the SP to activate the requested port. The SP issues a complementary command with the softkey value to circuit pack #5 to activate the port. The circuit pack runs a decryption algorithm to decode the key value and checks the value of an internal counter. The circuit pack then validates the key value using the counter value. Because the key value is valid, the circuit pack installs at least a portion of the key value in a special key receptacle on board the circuit pack which unlocks the feature. The circuit pack returns a message when the port has been activated. The SP forwards this message to the EMS which in turn returns a confirmation message to the service provider. This is the end of this sequence.

At step 7, as a result of this process, the port is activated, the hardware provider softkey database contains an assigned OC-3 key K3-452-V1. The same process is repeated to activate the corresponding port on NE#6.

An exemplary method for upgrading the same link from OC-3 to OC-12 is shown in FIG. 6 beginning at step 13. For the purposes of this example, it is assumed that the service provider is starting with the part of the link NE#4 to NE#6, and will continue with the conversion of the remainder of the ring afterward.

At step 13, the service provider issues a command to the EMS to deactivate port #2, on circuit pack #5 of NE#4.

At step 14, the EMS issues a command to NE#4 to deactivate the port. The SP issues a complementary command to the circuit pack to deactivate the port. The circuit pack deactivates the port, removes the key value from the key receptacle, increments the internal counter, generates a removed key value DK3-452-V1 and returns the removed key value DK3-452-1 to the SP. The removed key value is also encrypted. The SP returns a confirmation message to the EMS with the removed key value. The EMS stores the removed key value in a database. The removed key value is calculated using an algorithm that corresponds to a removed key algorithm running in the hardware supplier database. At least a portion of the prior key value K3-452-V1, in particular the interval counter value, "V1" is "remembered" by the circuit pack, i.e., it is stored in a non-volatile, non-destructible and non-user-accessible part of the circuit pack's memory. The prior key value is used by the key generation algorithm to calculate a new key value the next time it has to validate a key when the EMS attempts to install a key value. It is to be understood that the EMS use in this example is one variant of the present invention. The invention can be carried out without using an EMS.

At step 15, the EMS returns the confirmation to the service provider that the port has been deactivated. The removed key value is returned to the service provider.

At step 17, the service provider sends a command to the hardware provider softkey database to unassign the OC-3 key and returns the removed key value DK3-452-V1. The hardware provider softkey database remembers at least a portion of the unassigned key value K3-452-V1, in particular the interval counter value, to use in its key generation algorithm the next time it has to generate a key for activating port #2, on circuit pack #5. At step 18, the hardware provider softkey database returns a confirmation message. At this point the hardware provider softkey database contains an unassigned OC-3 key {K3} with internal counter value K3-452-V1 remembered.

At step 19, the service provider requests a new softkey to reflect an upgrade in service from OC-3 to OC-12.

The hardware provider can provide keys in a number of ways. In one scenario, the service provider sends the hardware provider a purchase order, and the hardware provider after receiving it, generates an unassigned OC-12 softkey. The hardware provider's database reflects the change: a new key {K12} is available. Whether the old key {K3} is retained by the service provider or returned to the hardware provider for some type of credit is an implementation feature of the database that reflects business operations. Another option is to buy a new key {K12} without removing the {K3} key. Various means could be used to inform the service provider. In this example, no message is sent back, but when the service provider checks his service provider area, it will notice the appearance of the new softkey. At this point the hardware provider softkey database contains an unassigned OC-12 key {K12} and at least a portion of the value K3-452-V1, the interval counter in particular, is remembered.

Beginning with step 21, the process for activating the OC-12 port is similar to the steps taken in steps 3 through 7 to activate the OC-3 port. At step 21, the service provider requests that an OC-12 key be assigned for circuit pack#5, port#2.

At step 22, the hardware provider database searches its content for an assignment based on circuit pack#5, port#2. If it finds one, it returns a negative message. If it finds none, then using an algorithm, it generates an encrypted key value which is shown as K12-452-V33. In one embodiment, the hardware provider uses an algorithm to generate a new key value much in the same manner as described above with respect to the OC-3 key generation. The OC-12 algorithm can be adapted so that the first OC-12 key value will be different from the first key value of the OC-3 key or any other key.

At step 23, the service provider provides the softkey value K12-452-V33 to the EMS software with a command to the EMS to provision port #2, on circuit pack #5.

At step 24, the EMS accepts the command and issues a complementary command with the softkey value to the SP to activate the requested port. The SP issues a complementary command with the softkey value to circuit pack #5 to activate the port. The circuit pack runs a decryption algorithm to decode the key value and checks the value of an internal counter. The circuit pack then validates the key value using the counter value. Because the key value is valid, the circuit pack installs at least a portion of the key value in a special key receptacle on board the circuit pack which unlocks the feature. The circuit pack returns a message when the port has been activated. The SP forwards this message to the EMS which in turn returns a confirmation message to the service provider. This is the end of this sequence.

At step 25, as a result of this process, the port is activated, the hardware provider softkey database contains an assigned OC-12 key K12-452-V33 and the internal counter value of K3-452-V1, in particular the value "V1", is remembered on the same port for future use if an OC-3 softkey were to be installed. The same process is repeated to activate the corresponding port on NE#6.

The softkey is, therefore, an entity that can be assigned a value for use in locking or unlocking features in a network. A hardware provider can sell a key to a service provider and when the service provider is ready to use the softkey, it can request that the hardware provider database system assign a value to the key. The softkey can be reused in the system once the used service is deactivated and an unassigned key value is returned.

Another function of one embodiment of the present invention is the system's ability to allow a user to begin using a feature without it being authorized and then later obtaining authorization to continue to use the feature. For example, if a service provider had the need for a network service at a time when the hardware provider was not available to provide a softkey to authorize the use, such as over a weekend, the system allows the service provider to use the service over the weekend and to obtain the softkey to authorize the use on Monday when the hardware provider was available.

In this example, the software provider could issue a command to begin using the network service provided by the network element. The network element could allow the use of the service but issue a major alarm that could not be masked. The service provider could use the service but would be inconvenienced by having an on-going major alarm condition. The service provider would only be able to turn off the major alarm once it purchases a softkey and uses the softkey to authorize the use of the network service.

Figure 7:
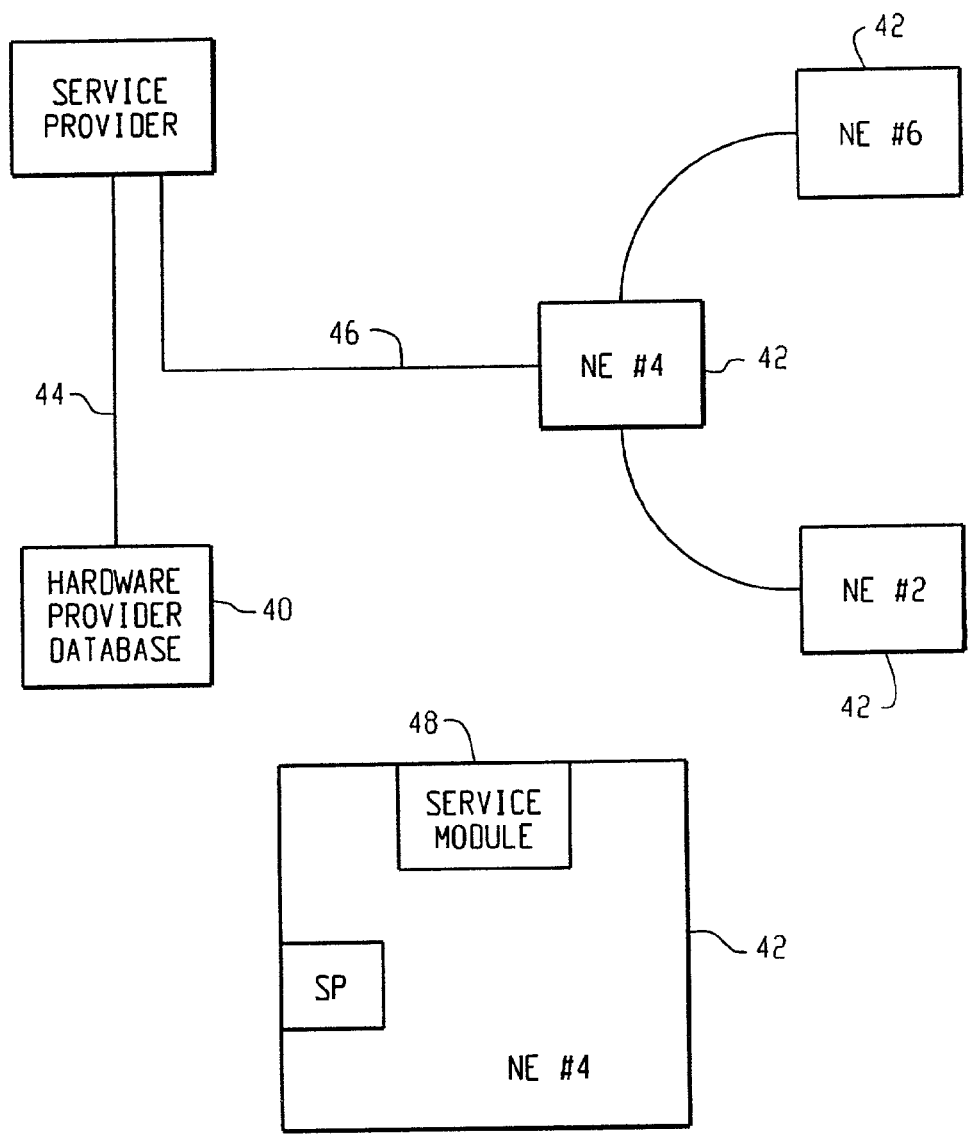
FIG. 7 is a block diagram of an exemplary system that utilizes the present invention.

Shown in FIG. 7 is an exemplary system that utilizes the present invention. The system comprises a hardware provider database 40 and a plurality of NEs 42. The service provider has a means for communicating with both the hardware provider database 40 and the NEs 42. In a preferred embodiment, the hardware provider database 40 is accessible via the Internet, and the service provider using a PC and Internet access path 44, such as modem, DSL line, LAN connection, and others, can securely exchange softkey information with the database 40. The service provider also can communicate with the NEs 42 using a conventional communication path 46 such as a dial-up, LAN or direct connection. The service provider can obtain key values for its purchased keys and transmit those key values to the NEs 42 to command service modules 48 contained within the NEs 42 to activate their service module functions. The service modules 48 could optionally be hardware modules, software modules, or combinations of hardware and software.

A preferred design and implementation of the softkey concept of the present invention will be described next. Described below is an example of: (A) how a softkey value could be defined; (B) how softkeys can be processed; and (C) the user interface (or commands) to deal with the softkeys. Sections (D) through (G) then describe further implementation details for using the invention with a Quad OC-3/OC-12 optical mapper card that may be included in an ADM such as the MCN 7000. This implementation of a softkey includes two unique attributes: (1) a key activation value that is good for one use only; and (2) when a key is retracted (or de-activated), the value displayed for the key serves as proof of the return since it can be checked with a validation algorithm.

A. Key Definition:

In a preferred system, the softkey value have the following parameters: (i) a card serial number; (ii) a given facility type (OC-3 or OC-12); (iii) a given port number (from 1 to the maximum of the card: 4 for the Quad OC-3/OC-12 card); (iv) a sequence number (internal counter); and (v) lock status. in the case of the Quad OC-3/12 card, one variant defines up to eight softkeys based on facility plus port number which yields eight keys. Another variant defines up to four softkeys based on facility and two ports at a time. The serial number is used to identify the specific card interface while the internal sequence number is used for security as described above. In the preferred system, a softkey is linked to a card, not to a shelf. Hence, if a card is moved from one slot to another or even from one shelf to another, its keys move with it. No additional provisioning is required.

The softkey have two additional attributes that are hidden from a user: lock status and sequence number. The lock status indicates if the key has been activated (facility unlocked) or not activated (facility locked). The sequence number represents a counter value for the number of times that the key has been activated and deactivated. To keep the softkey system secure, the internal sequence number is preferably stored on the card or service module with no user access and also stored with the hardware provider database system.

B. Key Processing:

Within a network element, each key needs to be activated to be effective. In one embodiment, the facility corresponding to the key cannot be used until the key is activated. In a preferred embodiment the facility can be used before the key is activated but, if the key is not activated and the corresponding facility within the network element is used, the network element will consider the traffic that is being passed as illegal. The network element will then generate a major alarm. This alarm will not be cancelable and will mask all other alarms that relate to the facility. The alarm can only be cleared when they proper key is entered (or the facility is not used anymore). A key may be de-activated if the facility is not needed anymore and the service provider wants to return the key to the hardware provider database system. A key may be activated/ de-activated as many times as needed.

C. User Interface

The Basic User Interface for softkeys is based on TL1 commands as an example. Three commands are defined to deal with the softkeys: (i) one to activate a key, (ii) one to de-activate a key, and (iii) last one to show the current key lock value.

D. Alarm

The 'softkey' alarm is raised when a facility is provisioned and the corresponding key has not been activated previously. The 'softkey' alarm is cleared when the corresponding key is activated or the facility is de-provisioned. The raised 'softkey' alarm will mask all alarms for the related facility. The name of the alarm preferably is "Feature not authorized". The alarm preferably is not programmable and it can not be masked or canceled. The recommended severity is MJ (major).

Key Information

The QUAD OC-3/OC-12 keys attributes are stored into the card's EEPROM. An exemplary map of the softkey area is as follows:

| Offset | Data item |
|--------|-----------|
| 0010 | Port 1, OC-3, Key sequence number |
| 0020 | Port 1, OC-3, Key lock status |
| 0030 | Port 1, OC-12 Key sequence number |
| 0040 | Port 1, OC-12, Key lock status |
| 0050 | Port 2, OC-3, Key sequence number |
| 0060 | Port 2, OC-3, Key lock status |
| 0070 | Port 2, OC-12, Key sequence number |
| 0080 | Port 2, OC-12, Key lock status |
| 0090 | Port 3, OC-3, Key sequence number |
| 00A0 | Port 3, OC-3, Key lock status |
| 00B0 | Port 3, OC-12, Key sequence number |
| 00C0 | Port 3, OC-12, Key lock status |
| 00D0 | Port 4, OC-3, Key sequence number |
| 00E0 | Port 4, OC-3, Key lock status |
| 00F0 | Port 4, OC-12, Key sequence number |
| 0100 | Port 4, OC-12, Key lock status |

For security purposes this information is N0T stored in the NE database.

F. Encryption

The following constraints apply to an associated encryption algorithm for use with the softkeys: (i) two activation key values for distinct facilities/ports on the same card preferably differ by a minimum of 66%; and (ii) related activation/ de-activation key values preferably differ by a minimum of 80%.

The proposed implementation provides flexibility to a user of the system. Using the described softkey implementation, the user may purchase at any time, any channel, bit rate combination needed. But even more, the implementation offers the capability to return a previously purchased key. A key may be activated, de-activated any number of times. At the same time, the system is secure since a key value is only valid once. Using the de-activated key value as proof of return is also a secure/easy way to guarantee that the de-activation as been performed.

Exemplary Network Element

The exemplary MCN 7000 20 may be equipped with the following components: an ACIU module 50, an NMCU module 52, a SMCU module 24, one cross connect such as an XCON 20G module, an XCON 40G module, or an XCON 60G module, an OC-192 module, an OC-48 module, a Quad OC-3/12 module, a DS3 module, a DS3/EC-1 module, a DS-1 module, an Ethernet module, a fast Ethernet module, a Gigabit Ethernet Module, a multi-link data module, a VPP module, a PSCU module, and/or a TIU module.

The ACIU module 50 is the Alarm and Craft interface Unit (ACIU). This module controls system alarms. The NMCU module 52 is the Network Management and Control Unit. This module manages all system communications (TL1, Ethernet, DCC, etc. . . ) with the outside world. SMCU module 24 is the System Management and Control Unit. This module manages all system provisioning, maintenance and alarm reporting.

The XCON 20G module provides the traffic connections for all traffic-carrying and protection slots of the MCN 7000 system. This module is capable of cross-connecting an aggregated traffic density of 20 Gb/s (non-blocking). On the top deck, it provides 4 slots with STS-48 connections and 2 slots with STS-12 connections. On the bottom deck, it provides 14 slots with STS-12 connections.

The XCON 40G module provides the traffic connections for all traffic-carrying and protection slots of the MCN 7000 system. This module is capable of cross-connecting an aggregated traffic density of 40 Gb/s (non-blocking). On the top deck, it provides 8 slots with STS-48 connections. On the bottom deck, it provides 6 slots with STS-48 connections and 8 slots with STS-12 connections.

The XCON 60G module provides the traffic connections for all traffic-carrying and protection slots of the MCN 7000 system. This module is capable of cross-connecting an aggregated traffic density of 60 Gb/s (non-blocking). On the top deck, it provides 4 slots with STS-192 connections and 4 slots with STS-48 connections (not available with double-width OC-192 modules). On the bottom deck, it provides 6 slots with STS-48 connections and 8 slots with STS-12 connections.

The OC-192 module supports one OC-192 channel with pointer processing to STS-1 level. The OC-192 module can be installed in any of the four OC-192 slots. Up to four (4) OC-192 modules can be installed in an MCN 7000 system.

The OC-48 module supports one OC-48 channel with pointer processing to STS-1 level. The OC-48 module can be installed in any traffic-carrying slots (slots U1–U8 and L1–L14). Up to twenty-two (22) OC-48 modules can be installed in an MCN 7000 system.

The Quad OC-3/12 module supports four channels that can be operated at OC-3 or OC-12 rates with pointer processing to STS-I level. The Quad OC-3/12 module can be installed in any traffic-carrying slots (slots U1–U8 and L1–L14). Up to twenty-two (22) Quad OC-3/12 modules can be installed in an MCN 7000 system.

The DS3 module supports eight (8) ITU-T compliant G.703/G.704 DS3 channels. The DS3 module can be installed in any of the traffic-carrying and protection slots of the bottom deck. Up to twelve (12) DS3 working modules and two (2) DS3 protection module can be installed in an MCN 7000 system.

The DS3/EC-1 module provides eight (8) Telcordia compliant GR-499 (D53) and GR-253 (EC-1) DS3/EC-1 channels. The DS3/EC-1 module can be installed in any of the traffic-carrying and protections slots of the bottom deck. Up to twelve (12) DS3/EC-1 working modules and two (2) DS3/EC-1 protection modules can be installed in a MCN 7000 system.

The DS1 module supports twenty-eight (28) ITU-T compliant G.703/G.704 DS1 channels. The DS1 module can be installed in any of the traffic carrying and protections slots of the bottom deck. Up to twelve (12) DS1 working modules and two (2) DS1 protection module can be installed in a MCN 7000 system.

The Ethernet Module supports twenty-four (24) 10BaseT RJ45 Ethernet ports and maps them into N×STS–3c, N=1 or 2. This Packet over SONET (POS) module is used to provide Transparent LAN services (TLS) and Router Port Extension (RPE). The Ethernet module can be installed in any of the traffic carrying and protections slots of the bottom deck. Up to twelve (12) Ethernet modules can be installed in a MCN 7000 system and can be protected using a 1+1 scheme.

The Fast Ethernet Module supports eight 100BaseTx RJ45 Fast Ethernet ports and maps them into STS-1 or STS-3c. This Packet over SONET (POS) module is used to provide Transparent LAN services (TLS) and Router Fort Extension (RPE). The Fast Ethernet module can be installed in any of the traffic carrying and protections slots of the bottom deck. Up to twelve (12) Fast Ethernet modules can be installed in a MCN 7000 system and can be protected using a 1+1 scheme.

The Gigabit Ethernet Module supports two 1000BaseSx Gigabit Ethernet ports and maps them into N×STS–3c, N=1 to 16. This Packet over SONET (POS) module is used to provide Transparent LAN services (TLS) and Router Port Extension (RPE). The Gigabit Ethernet module can be installed in any traffic-carrying slots. Up to twenty (20) Gigabit Ethernet modules can be installed in a MCN 7000 system and can be protected using a 1+1 scheme.

The Multi-link Data module provides 126 MLPPP/Frame Relay DSl/El mapped into 120 VT1.5 (VC-11) VT2 (VC-12) termination to Packet Over SONET (POS) over an STS-3c frame. Up to ten (10) 1+1 protected or twenty (20) unprotected Multi-link Data modules can be installed, each fitting in any of the traffic-carrying slots of the MCN 7000 system.

The VPP module provides the capability of terminating and pre-grooming 4 PacketPath Virtual Rings of variable speed in order to send the packets to the data switch. It is used in hubbing applications where the MCN 7000 terminates a large number of rings. A 1+1 protection scheme is available.

The Protection Switching and Control Unit (PSCU) module supports protection switching for up to six (6) working modules. One type of PSCU module, the PSCU DS1/E1, offers 1:6 protection for up to six DS1/E1 modules. Another type of PSCU module, the PSCU DS3/EC-1, offers 1:6 protection for up to six DS3/EC-1 modules.

The Tributary Interface Unit (TIU) module is passive and provides the connection points for the electrical signals such as DS1, E1, DS3, and Ethernet at the rear of the shelf. Twelve TIU modules can be installed in TIU slots of the MCN 7000 system. The five variants of the TIU are: (1) TIU DS1 provides the connection points for 28 DS 1 interfaces; (2) TIU E1 provides the connection points for 28 E1 interfaces; (3) TIU D53/EC-1 provides the connection points for 8 D53/EC-1 interfaces; (4) TIU Ethernet provides the connections points for 24 Ethernet interfaces; and (5) TIU Fast Ethernet provides the connections points for 8 Fast Ethernet interfaces.

The preferred embodiment described with reference to the drawing figures is presented only to demonstrate an example of the invention. Additional, and/or alternative, embodiments of the invention would be apparent to one of ordinary skill in the art upon reading this disclosure. Having described in detail the preferred embodiments of the present invention, including preferred modes of operation, it is to be understood that this invention and operation could be constructed and carried out with different elements and steps. The preferred embodiments are presented only by way of example and are not meant to limit the scope of the present invention, which is defined by the following claims.

What is claimed is:

1. A network element having a plurality of features wherein at least one of the features may be optionally enabled or disabled, the network element comprising:
    a service module that provides a first network features that may be optionally enabled or disabled;
    a system processor that is operable to receive a softkey value inputted from outside of the network element, wherein the softkey value is received by the network element via a network connection; and
    a softkey validation system that is operable to enable the use of the first network feature when the received softkey value is the same as a first valid softkey value, the softkey validation system also being operable to enable the use of the first network feature a second time, after the first network feature has been deactivated, when the received softkey value is the same as a second valid softkey value, wherein the first valid softkey value is not the same as the second valid softkey value and the first and the second softkey values are machine generated and can be used only once in relation to the first network feature, the softkey validation system comprising memory for storing information related to the service module and code that when implemented causes the softkey validation system to confirm whether the received softkey value is a valid softkey value, the softkey validation system enabling the use of the network feature after confirmation that the received softkey value is valid.

2. The network element according to claim 1 wherein enabling the use of the network feature comprises enabling the use of the network feature without the generation of alarms.

3. The network element according to claim 1 wherein enabling the use of the network feature comprises enabling the use of the network feature when the network feature could not be used, even in an alarm state, without being enabled through the softkey system.

4. The network element according to claim 1 wherein the code when implemented causes the softkey validation system to generate a deactivated softkey value when the first network feature has been deactivated.

5. A node element in a communication network, comprising:
    a service module that provides a first network features that may be optionally enabled or disabled;
    a system processor that is operable to receive a softkey value inputted from outside of the network element wherein the softkey value is received by the network element via a network connection; and
    a softkey validation system that is operable to enable the use of the first network feature when the received softkey value is the same as a first valid softkey value, the softkey validation system also being operable to enable the use of the first network feature a second time, after the first network feature has been deactivated, when the received softkey value is the same as a second valid softkey value, wherein the first valid softkey value is not the same as the second valid softkey value and the first and the second softkey values are machine generated and can be used only once in relation to the first network feature, the softkey validation system comprising memory for storing information relaxed to the service module and software instructions that when implemented causes the softkey validation system to confirm whether the received softkey value is a valid softkey value, the softkey validation system enabling the use of the network feature after confirmation that the received softkey value is valid.

6. The node element according to claim 5 wherein the service module is a communication module.

7. The node element according to claim 5 wherein the first network feature is a communication port.

8. The node element according to claim 7 wherein the first network feature is a OC-3 port.

9. The node element according to claim 7 wherein the first network feature is a OC-12 port.

10. The node element according to claim 7 wherein the first network feature is a OC-48 port.

11. The node element according to claim 7 wherein the first network feature is a OC-192 port.

12. The node element according to claim 7 wherein the first network feature is a EC-1 port.

13. The node element according to claim 7 wherein the first network feature is a DS3 port.

14. The node element according to claim 7 wherein the first network feature is a DS1 port.

15. The node element according to claim 7 wherein the first network feature is a E1 port.

16. The node element according to claim 7 wherein the first network feature is an Ethernet port.

17. The node element according to claim 7 wherein the first network feature is a Fast Ethernet port.

18. The node element according to claim 7 wherein the first network feature is a Gigabit Ethernet port.

19. The node element according to claim 5 wherein the service module is an optical mapper.

20. The node element according to claim 19 wherein the first network feature is an optical network port.

21. The node element according to claim 5 wherein the service module is implemented via software instructions stored in said node element.

22. The node element according to claim 21 wherein the first network feature is an output resulting from executing the software instruction on said node element.

23. A system for enabling the use of network features in a network element, comprising:
    a softkey assignment system that is operable to perform operations with respect to at least one softkey, the softkey assignment system being operable to assign a softkey value to the softkey and to update the softkey status to an assigned state upon the assignment of a softkey value to the softkey, the softkey assignment system also being operable to update the softkey status to an unassigned state upon the receipt of a deactivate softkey value for the softkey; and
    a network element, the network element comprising a service module that provides a first network features that may be optionally enabled or disabled, the network element further comprising a system processor that is operable to receive a softkey value inputted from outside of the network element, wherein the softkey value is received by the network element via a network connection, the network element further comprising a softkey validation system that is operable to enable the use of the first network feature when a received softkey value is the same as a first valid softkey value, the softkey validation system also being operable to enable the use of the first network feature a second time, after the first network feature has been deactivated, when the received softkey value is the same as a second valid softkey value, wherein the first valid softkey value is not the same as the second valid softkey value and the first and the second softkey values are machine generated and can be used only once in relation to the first network feature.

24. The system according to claim 23 wherein the service module includes the softkey validation system.

25. The system according to claim 23 wherein the network element further comprises a shelf processor and wherein the shelf processor includes the softkey validation system.

26. The system according to claim 23 wherein the service module comprises an internal counter and wherein the internal counter stores a value that is used by the softkey validation system in determining whether the received softkey value is valid.

27. A method for enabling the use of network features in a network element within a network, the network element comprising a service module that provides a first network features that may be optionally enabled, the method comprising the steps of:
receiving an encrypted softkey value from outside of the network element, wherein the softkey value is received by the network element via a network connection;
decrypting the encrypted softkey value;
determining whether the received softkey value is equal to a first valid softkey value;
enabling the first network feature if the received softkey value is equal to the first valid softkey value; and
providing a mechanism for deriving a second valid softkey value wherein the second valid softkey value is not equal to the first valid softkey value, wherein the second valid softkey value is operative to allow the first network feature to be activated if the first network feature is deactivated after it has been activated using the first valid softkey value, and wherein the first valid softkey value is not operative to allow the first network feature to be activated again if the first network feature is deactivated after it has been activated using the first valid softkey value and the first and the second softkey values are machine generated and can be used only once in relation to the first network feature.

28. A method for enabling the use of network features in a network, the network comprising a softkey assignment system, and a network element comprising a service module that provides a first network features that may be optionally enabled, the method comprising the steps of:
providing a customer with a reusable softkey;
generating with the softkey assignment system a softkey value for the softkey;
encrypting the softkey value;
assigning the encrypted softkey value to the softkey;
providing the encrypted softkey value to the customer upon the customer's request to use the softkey;
updating the state of the softkey to an assigned state upon assigning the encrypted softkey value to the softkey;
providing within the network element a validation system that is operable to: (a) receive an encrypted softkey value from outside of the network element, wherein the softkey value is received by the network element via a network connection, (b) decrypt the encrypted softkey value, (c) determine whether the received softkey value is equal to a first valid softkey value, and (d) enable the first network feature if the received softkey value is equal to the first valid softkey value;
providing with the service module a system for deriving a second valid softkey value wherein the second valid softkey value is not equal to the first valid softkey value, wherein the second valid softkey value is operative to allow the first network feature to be activated if the first network feature is deactivated after it has been activated using the first valid softkey value, and wherein the first valid softkey value is not operative to allow the first network feature to be activated again if the first network feature is deactivated after it has been activated using the first valid softkey value and the first and the second softkey values are machine generated and can be used only once in relation to the first network feature;
providing a method for allowing the customer to return the softkey to an unassigned state; and
allowing the customer to re-use the softkey for activating a second network feature by allowing the softkey assignment system to provide the customer with a second softkey value upon request if the softkey is in an unassigned state at the time of the request.

29. The method of claim 28 wherein the providing a method for allowing the customer to return the softkey step comprises the steps of:
providing within the network element a system for deactivating the feature associated with the installed softkey and for returning to the customer a deactivation key value upon deactivation of the feature;
accepting the deactivation key value from the customer; and
updating the state of the softkey to reflect that it is in an unassigned state.

30. The method of claim 28 wherein the system for deriving a second valid softkey value comprises a counter within the service module that keeps track of the number of times that the service module feature has been activated.

31. The method of claim 28 wherein the system for deriving a second valid softkey value comprises a counter within the service module that keeps track of the number of times that the service module feature has been activated.

32. The method of claim 28 wherein the service module comprises a key holding location and wherein the first network feature is enabled by loading a valid key value into the key holding location.

33. The method of claim 28 wherein the service module comprises a key holding location and wherein the first network feature is enabled by loading data derived from at least a portion of the valid key value into the key holding location.

34. A method for authorizing the use of a network feature in a network, the network comprising a softkey assignment system, and a network element comprising a service module that provides a first network feature that may be optionally authorized, the method comprising the steps of:
allowing a customer to use the first network feature;
generating an alarm condition when the customer uses the first network feature without supplying a softkey value;
providing a customer with a softkey upon request by the customer;
generating the softkey value for the softkey;
providing the softkey value to the customer upon request by the customer; and canceling the alarm condition in response to the customer supplying the softkey value to the network element, wherein the softkey value is encrypted and wherein the network element comprises a validation system that is operable to: (a) receive the encrypted softkey value from outside of the network element, wherein the softkey value is received by the network element via a network connection, (b) decrypt the encrypted softkey value, (c) determine whether the received softkey value is equal to a first valid softkey value, and (d) authorize the use of the first network feature if the received softkey value is equal to the first valid softkey value; and wherein the service module comprises a system for deriving a second valid softkey value wherein the second valid softkey value is not equal to the first valid softkey value, wherein the second valid softkey value is operative to allow the first network feature to be authorized if the first network feature is de-authorized after it has been authorized using the first valid softkey value, and wherein the first valid softkey value is not operative to allow the first network feature to be authorized again if the first network feature is de-authorized after it has been authorized using the first valid softkey value and the first and the second softkey values are machine generated and can be used only once in relation to the first network feature.

* * * * *

UNITED STATES PATENT AND TRADEMARK OFFICE
CERTIFICATE OF CORRECTION

PATENT NO. : 7,058,972 B2
APPLICATION NO. : 09/875723
DATED : June 6, 2006
INVENTOR(S) : Jussy et al.

It is certified that error appears in the above-identified patent and that said Letters Patent is hereby corrected as shown below:

Title Page 2, in Field (56), under "U.S. PATENT DOCUMENTS", in Column 1, Line 3, delete "713/162" and insert -- 713/202 --, therefor.

Title Page 2, in Field (56), under "U.S. PATENT DOCUMENTS", in Column 1, Line 5, delete "713/202" and insert -- 713/162 --, therefor.

In Column 7, Line 12, delete "DK3-452-1" and insert -- DK3-452-V1 --, therefor.

In Column 10, Line 27, after "exemplary" insert -- memory --.

In Column 14, Line 6, in Claim 5, delete "relaxed" and insert -- related --, therefor.

Signed and Sealed this

Twenty-second Day of June, 2010

David J. Kappos
*Director of the United States Patent and Trademark Office*